(12) United States Patent
Kirovski et al.

(10) Patent No.: US 7,389,421 B2
(45) Date of Patent: Jun. 17, 2008

(54) COUNTERMEASURE AGAINST ESTIMATION-BASED ATTACKS OF SPREAD-SPECTRUM WATERMARKS

(75) Inventors: Darko Kirovski, Bellevue, WA (US); Henrique Malvar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 10/127,029

(22) Filed: Apr. 18, 2002

(65) Prior Publication Data

US 2003/0200438 A1    Oct. 23, 2003

(51) Int. Cl.
*H04L 9/00* (2006.01)
*G09C 3/00* (2006.01)
*G09C 5/00* (2006.01)
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. .................. 713/176; 380/54; 726/22
(58) Field of Classification Search ................ 713/176
See application file for complete search history.

(56) References Cited

U.S. PATENT DOCUMENTS

| | | | | |
|---|---|---|---|---|
| 5,930,369 A | * | 7/1999 | Cox et al. | 380/54 |
| 6,456,727 B1 | * | 9/2002 | Echizen et al. | 382/100 |
| 6,614,914 B1 | * | 9/2003 | Rhoads et al. | 382/100 |
| 6,654,479 B1 | * | 11/2003 | Liao et al. | 382/100 |
| 6,879,703 B2 | * | 4/2005 | Lin et al. | 382/100 |
| 6,901,514 B1 | * | 5/2005 | Iu et al. | 713/176 |
| 6,901,515 B1 | * | 5/2005 | Muratani | 713/176 |
| 2001/0029580 A1 | * | 10/2001 | Moskowitz | 713/176 |
| 2002/0009208 A1 | * | 1/2002 | Alattar et al. | 382/100 |
| 2002/0099943 A1 | * | 7/2002 | Rodriguez et al. | 713/176 |
| 2002/0157005 A1 | * | 10/2002 | Brunk et al. | 713/176 |
| 2004/0218761 A1 | * | 11/2004 | Gustafson | 380/238 |

OTHER PUBLICATIONS

Voloshynovskiy, Sviatolsav et al. "Attacks on Digital Watermarks: Classification, Estimation-Based Attacks, and Benchmarks," IEEE Communications Magazine, Aug. 2001, pp. 2-10.*

(Continued)

*Primary Examiner*—Emmanuel L Moise
*Assistant Examiner*—Nadia Khoshnoodi
(74) *Attorney, Agent, or Firm*—Lee & Hayes, PLLC

(57) ABSTRACT

Described herein is a technology for facilitating watermark detection. Spread-spectrum watermarking is a commonly employed technique for hiding data in digital goods (e.g., multimedia signals). Such watermarks may be potentially vulnerable to so-called "watermark estimation-based attacks." At least one implementation, described herein, is an advancement over the traditional spread-spectrum watermark detector. At least one implementation, described herein, greatly discourages an estimation-based attack by an adversary. At least one implementation, described herein, determines whether a digital good has likely been subjected to an estimation-based attack and, at least, approximately reverses such attack. The scope of the present invention is pointed out in the appending claims.

11 Claims, 6 Drawing Sheets

OTHER PUBLICATIONS

Sviatolsav Voloshynovskiy, Shelby Pereira & Thierry Pun (University of Geneva), Joachim J. Eggers & Jonathan K. Su (University of Erlangen-Nuremberg), "Attacks on Digital Watermarks: Classification, Estimation-Based Attacks, and Benchmarks," IEEE Communications Magazine, Aug. 2001, pp. 2-10.

D. Kirovski and H.S. Malvar. Embedding and Detecting Spread-Spectrum Watermarks under the Estimation Attack. IEEE International Conference on Acoustics, Speech, and Signal Processing, vol. 2, pp. 1293-1296, 2002.

Kirovski, et al., "Robust Spread-Spectrum Audio Watermarking" 2001 IEEE p. 1345-1348.

D. Kirovski and H.S. Malvar. Spread Spectrum Watermarking of Audio Signals. IEEE Transactions on Signal Processing, vol. 51, (No. 4), pp. 1020-1033, 2003.

* cited by examiner pdf(y) before an estimation-based attack

An estimation-based attack will move each half of pdf(y) against its sign.

Decomposed pdf(z) after an estimation-based attack.

Decomposed pdf(u) after "undoing" the attack

Composed pdf(z) after an estimation-based attack

COUNTERMEASURE AGAINST ESTIMATION-BASED ATTACKS OF SPREAD-SPECTRUM WATERMARKS

TECHNICAL FIELD

This invention generally relates to a technology for facilitating watermark detection.

BACKGROUND

Digital goods are often distributed to consumers over private and public networks—such as Intranets and the Internet. In addition, these goods are distributed to consumers via fixed computer readable media, such as a compact disc (CD-ROM), digital versatile disc (DVD), soft magnetic diskette, or hard magnetic disk (e.g., a preloaded hard drive).

Unfortunately, it is relatively easy for a person to pirate the pristine digital content of a digital good at the expense and harm of the content owners—which includes the content author, publisher, developer, distributor, etc. The content-based industries (e.g., entertainment, music, film, etc.) that produce and distribute content are plagued by lost revenues due to digital piracy.

Modern digital pirates effectively rob content owners of their lawful compensation. Unless technology provides a mechanism to protect the rights of content owners, the creative community and culture will be impoverished.

"Digital goods" is a generic label for electronically stored or transmitted content. Examples of digital goods include images, audio clips, video, multimedia, software, and data. Digital goods may also be called a "digital signal," "content signal," "digital bitstream," "media signal," "digital object," "object," and the like.

Watermarking

Watermarking is one of the most promising techniques for protecting the content owner's rights of a digital good. Generally, watermarking is a process of altering the digital good such that its perceptual characteristics are preserved. More specifically, a "watermark" is a pattern of bits inserted into a digital good that may be used to identify the content owners and/or the protected rights.

Generally, watermarks are designed to be invisible or, more precisely, to be imperceptible to humans and statistical analysis tools.

A watermark embedder (i.e., encoder) is used to embed a watermark into a digital good. A watermark detector is used to detect (or extract) the watermark in the watermarked digital good. Watermark detection is often performed in real-time even on small devices.

Conventional Watermarking Technology

Conventional technologies for watermarking media signals rely on the imperfections of human perceptions (e.g., the human auditory system (HAS) or the human visual system (HVS)). For example, in the realm of audio signals, several conventional secret hiding techniques explore the fact that the HAS is insensitive to small amplitude changes—either in the time or frequency domains—as well as insertion of low-amplitude time-domain echoes.

The watermark can be regarded as an additive signal w, which contains the encoded and modulated watermark message b under constraints on the introduced perceptible distortions given by a mask M so that:

$$y = x + w(M).$$

Commonly-used conventional watermark embedding techniques can be classified into spread-spectrum (SS) (which is often implemented using additive or multiplicative techniques) and quantization-based (e.g., quantization index modulation (QIM)) schemes.

Those of ordinary skill in the art are familiar with conventional techniques and technology associated with watermarks, watermark embedding, and watermark detecting.

Robustness

In most watermarking applications, the marked goods are likely to be processed in some way before it reaches the watermark receiver. The processing could be lossy compression, signal enhancement, or digital-to-analog (D/A) and analog-to-digital (A/D) conversion. An embedded watermark may unintentionally or inadvertently be impaired by such processing. Other types of processing may be applied with the explicit goal of hindering watermark reception. This is an attack on the watermark (or the watermarked good) by a so-called adversary.

In watermarking terminology, an attack may be thought of as any processing that may impair detection of the watermark or communication of the information conveyed by the watermark or intends to do so. The processed watermarked goods may be then called attacked goods.

Of course, key aspect of a watermarking technology is its robustness against attacks. The notion of robustness is intuitively clear to those of ordinary skill in the art: A watermark is robust if it cannot be impaired without also rendering the attacked goods less useful.

Watermark impairment can be measured by several criteria, for example: miss probability, probability of bit error, or channel capacity. For multimedia, the usefulness of the attacked data can be gauged by considering its perceptual quality or distortion. Hence, robustness may be evaluated by simultaneously considering watermark impairment and the distortion of the attacked good.

Estimation-based Attack

To accomplish an estimation-based attack, the adversary is able estimate—at least partially—the original good or the watermark from the watermarked good using some knowledge of the goods' statistics. An estimation-based attack does not need any knowledge of the secret key used for watermark embedding. Furthermore, knowledge of the embedding rule is not required; however, the attack may be more successful with it.

Depending on the final purpose of the attack, the adversary may obtain an estimate of the original good or of the watermark based on some stochastic criteria such as maximum likelihood (ML), maximum a posteriori probability (MAP), or minimum mean square error (MMSE). Depending on the way the estimate is used, these attacks may be classified as one of various forms of attacks, such as a removal attack, a protocol attack, or a desynchronization attack.

Framework to Thwart Estimation-based Attacks

Accordingly, it is a challenge to create a framework to thwart estimation-based attacks. It is desirable for such a framework to increase watermark robustness with respect to estimation-based attacks. Furthermore, it desirable for such a framework to do so when the adversary knows all the details how the watermark is embedded except the hidden secret.

SUMMARY

Described herein is a technology for facilitating watermark detection.

Spread-spectrum watermarking is a commonly employed technique for hiding data in digital goods (e.g., multimedia signals). Such watermarks are conventionally considered strongly robust, particularly with respect to blind, Stirmark-like, signal processing attacks. However, such watermarks may be potentially vulnerable to so-called "watermark estimation-based attacks."

At least one implementation, described herein, is an advancement over the traditional spread-spectrum watermark detector. At least one implementation, described herein, greatly discourages an estimation-based attack by an adversary. At least one implementation, described herein, determines whether a good has likely been subjected to an estimation-based attack and, at least, approximately reverses such attack.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of a Countermeasure against Estimation-based Attacks of Spread-Spectrum Watermarks that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Countermeasure against Estimation-based Attacks of Spread-Spectrum Watermarks may be referred to as an "exemplary countermeasure."

Introduction

Figure 5:
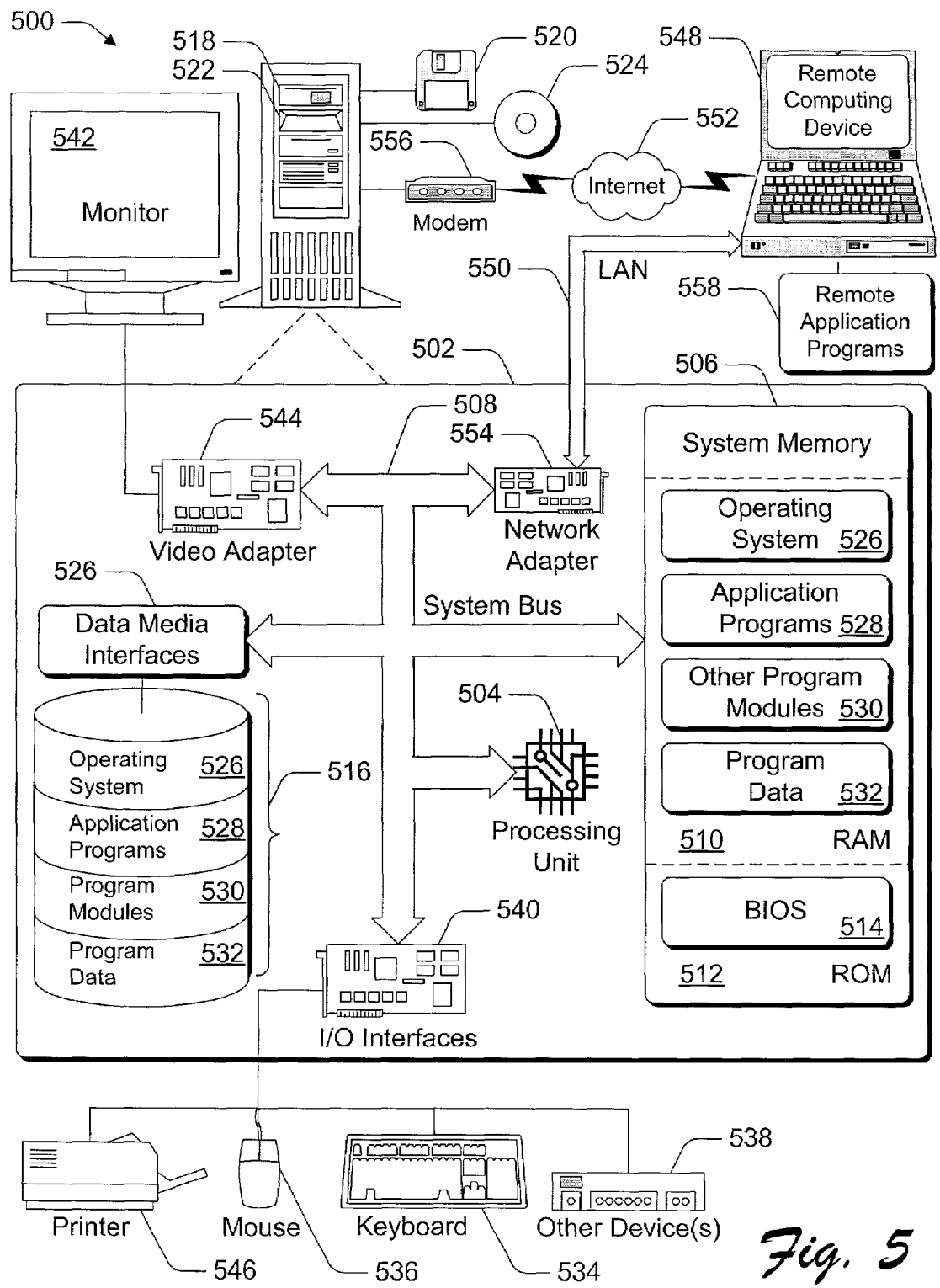
FIG. 5 is an example of a computing operating environment capable of implementing at least one embodiment (wholly or partially) described herein.

The exemplary countermeasure may be implemented on computing systems and computer networks like that show in FIG. 5. Although the exemplary countermeasure may have many applications, digital rights management is an example of a particular application.

Spread-spectrum watermarking is a commonly employed technique for hiding data in digital goods (e.g., multimedia signals). Such watermarks are conventionally considered strongly robust, particularly with respect to blind, Stirmark-like, signal processing attacks. However, such watermarks may be potentially vulnerable to so-called "watermark estimation-based attacks." When launching an estimation-based attack successfully, it is not uncommon for an adversary to be aware of how a watermark is embedded, but not know the hidden secret or key.

The exemplary countermeasure introduces an advancement to the traditional spread-spectrum watermark detector. The exemplary countermeasure greatly discourages an estimation-based attack by an adversary. The exemplary countermeasure determines whether a good has likely been subjected to an estimation-based attack and, at least, approximately reverses such attack.

Ideally, with the exemplary countermeasure, the adversary is forced to add an amount of noise equal or greater in proportion to the amplitude of the recorded good in order to successfully impair (e.g., remove) a spread-spectrum watermark. Doing so greatly affects the perceptible quality of the good and results in poor quality goods. Consequently, the effectiveness of watermark estimation-based attacks is significantly reduced.

Digital Goods Production and Distribution System Employing Watermarks

Figure 1:
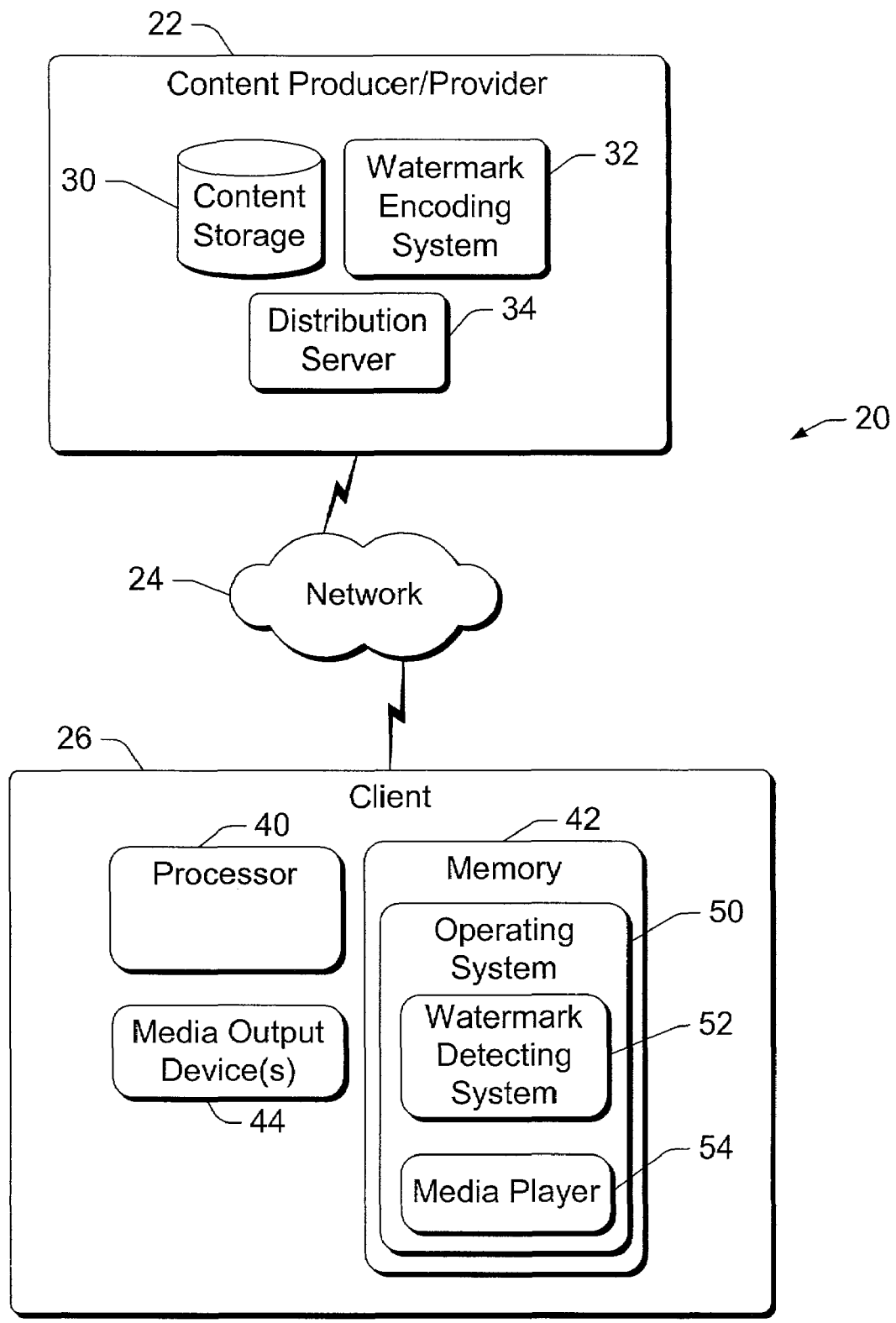
FIG. 1 illustrates a digital-goods-production-and-distribution system which may employ (wholly or partially) an implementation described herein.

FIG. 1 shows an example of a digital-goods-production-and-distribution system 20. The exemplary countermeasure may be employed as part of such a system.

The digital-goods-production-and-distribution system 20 has a content producer/provider 22 that produces original musical content and distributes the content over a network 24 to a client 26. The content producer/provider 22 has a content storage 30 to store digital datastreams of original content. The content producer 22 has a watermark encoding system 32 to sign the datastream with a watermark that identifies the content as original. The watermark encoding system 32 may be implemented as a standalone process or incorporated into other applications or an operating system.

Typically, a watermark is an array of bits generated using a cryptographically secure pseudo-random bit generator and an error correction encoder. The pseudo-randomness of each watermark is provided by initiating the bit generator with a key unique to each content publisher. The watermark is embedded into a digital good by altering its frequency magnitudes such that the perceptual characteristics of the original recording are preserved. Each magnitude in the frequency spectrum is altered according to the appropriate bit in the watermark.

The watermark encoding system 32 applies the watermark to an original digital good from the content storage 30. Typically, the watermark identifies the content producer 22, providing a signature that is embedded in the original good and cannot be removed. The watermark is designed to survive all typical kinds of processing, including compression, equalization, D/A and A/D conversion, recording on analog tape, and so forth. It is also designed to survive malicious attacks that attempt to remove the watermark from the good, including changes in time and frequency scales, pitch shifting, and cut/paste editing.

The content producer/provider 22 has a distribution server 34 that streams the watermarked content over the network 24 (e.g., the Internet). A datastream with a watermark embedded therein represents to a recipient that the stream is being distributed in accordance with the copyright authority of the content producer/provider 22. The server 34 may further compress and/or encrypt the content conventional compression and encryption techniques prior to distributing the content over the network 24.

The client 26 is equipped with a processor 40, a memory 42, and one or more media output devices 44. The processor 40 runs various tools to process the datastream, such as tools to decompress the stream, decrypt the date, filter the content, and/or apply media controls (tone, volume, color, etc.). The memory 42 stores an operating system 50 (such as the Microsoft® Windows 2000® operating system), which executes on the processor. The client 26 may be embodied in a many different ways, including a computer, a handheld entertainment device, a set-top box, a television, an audio appliance, and so forth.

The operating system 50 implements a client-side watermark detecting system 52 to detect watermarks in the datastream. The exemplary countermeasure may be implemented as part of the watermark detecting system 52 or as a front-end to such a system. If the watermark is present, the client can identify its copyright and other associated information.

In the case of a multimedia datastream, the operating system 50 implements a media player 54 to facilitate play of the multimedia content through the media output device(s) 44 (e.g., sound card, speakers, displays, etc.).

The operating system 50 and/or processor 40 may be configured to enforce certain rules imposed by the content producer/provider (or copyright owner). For instance, the operating system and/or processor may be configured to reject fake or copied content that does not possess a valid watermark. In another example, the system could play unverified content with a reduced level of fidelity.

Traditional Spread-Spectrum Watermarking

Consider a media good (i.e., a digital good) to be watermarked $\tilde{x} \in \mathcal{R}^N$. It can be modeled as a random vector, where each element $x_i$ of $\tilde{x}$ is a normal independent identically distributed (i.i.d.) random variable with standard deviation $\sigma_x$ (i.e., $x_j \sim \mathcal{N}(0, \sigma_x)$).

A watermark may be defined as a spread-spectrum sequence $\tilde{w}$, which is a vector pseudo-randomly generated in $\tilde{w} \in \{\pm 1\}^N$. Each element $w_j$ is usually called a "chip." Often, watermark chips are generated such that they are mutually independent with respect to the original digital good $\tilde{x}$. The marked digital goody is created by vector addition $\tilde{y} = \tilde{x} + \tilde{w}$. Typically, signal variance $\sigma_x^2$ directly impacts the security of the scheme: the higher the variance, the more securely information can be hidden in the digital good.

Let $\tilde{p} \cdot \tilde{q}$ denote the normalized inner product of vectors $\tilde{p}$ and $\tilde{q}$ (i.e. $\tilde{p} \cdot \tilde{q} \equiv N^{-1} \Sigma p_j q_j$, with $w^2 \equiv \tilde{p}^2 = \tilde{p} \cdot \tilde{p}$. For example, for $\tilde{w}$ as defined above we have $\tilde{w}^2 = 1$. Typically, the watermark is detected by correlating (or matched filtering) a given digital good vector $\tilde{z}$ with the watermark $\tilde{w}$:

$$C(\tilde{z}, \tilde{w}) = \tilde{z} \cdot \tilde{w} = E[\tilde{z} \cdot \tilde{w}] + \aleph\left(0, \frac{\sigma_x}{\sqrt{N}}\right). \quad (1.1)$$

Under no malicious attacks or other signal modifications, if the digital good $\tilde{z}$ has been marked, then $E[\tilde{z} \cdot \tilde{w}] = 1$, else $E[\tilde{z} \cdot \tilde{w}] = 0$. The detector decides that the watermark is present if $C(\tilde{z}, \tilde{w}) > \tau$, where $\tau$ is a detection threshold that controls the tradeoff between the probabilities of false positive and false negative decisions.

From modulation and detection theory, those of ordinary skill in the art will see that under the condition that $\tilde{x}$ and $\tilde{w}$ are i.i.d. goods (e.g., signals), such a detector is optimal. Finally, the probability $P_{FA}$ that the detection decision is a false alarm is quantified as:

$$P_{FA} = \Pr[C(\tilde{z}, \tilde{w}) \geq \tau \mid (\tilde{z} = \tilde{x})] = \frac{1}{2} erfc\left(\frac{\tau \sqrt{N}}{\sigma_x \sqrt{2}}\right) \quad (1.2)$$

and the probability $P_{MD}$ that the detection decision is a misdetection is quantified as:

$$P_{MD} = \quad (1.3)$$
$$\Pr[C(\tilde{z}, \tilde{w}) \geq \tau \mid (\tilde{z} = \tilde{x} + \tilde{w})] = \frac{1}{2} erfc\left(\frac{(E[\tilde{z}, \tilde{w}] - \tau)\sqrt{N}}{\sigma_x \sqrt{2}}\right)$$

Direct application of traditional spread-spectrum watermarking as a data hiding tool is vulnerable to attacks from an adversary.

For example, a standard, traditional spread-spectrum watermarked digital good is vulnerable to geometric transformations of the good that aim at desynchronizing $\tilde{w}$ with respect to its location in the marked content. With audio content, for example, such attacks are independent time and pitch scaling with added fluctuations (i.e., wow-and-flutter, cropping and pasting, etc.). Only a slight misalignment of the involved vectors is likely to generate an incorrect detection decision.

Estimation-Based Attack of Spread-Spectrum Watermarks

A traditional spread-spectrum watermark is venerable to an estimation-based attack. An adversary may estimate the embedded watermark or the original digital good. Armed with this estimate, the adversary may impair the watermark by, for example, removing it.

If an adversary knows all details of how the watermark is embedded, except for the watermark $\tilde{w}$ itself, the adversary can compute the watermark estimate $\tilde{v}$ from one marked digital good or multiple goods with the same mark. The adversary may then amplify the watermark estimate $\tilde{v}$ with a factor $\alpha > 1$, and then subtract the amplified attack vector from the marked content $\tilde{y}$.

The result is an attacked digital good $\tilde{z}$ with the estimated watermark removed:

$$\tilde{z} = \tilde{y} - \alpha \tilde{v} \qquad (1.4)$$

The estimation attack adds noise (in Equation (1.4), it is $-\alpha\tilde{v}$) to the marked digital good. It is likely, that at least part of this noise is an accurate estimate of the watermark. Therefore, this noise at least partially reverses the effect of the watermarking process. In so doing, this noise may impair detection of the watermark.

Exemplary Countermeasure to an Estimation-based Attack

The exemplary countermeasure provides an effective remedy for an estimation-based attack, like that shown in Equation (1.4). Hopefully, an adversary will be forced to substantially and perceptually distort the digital good to avoid the exemplary countermeasure.

With the exemplary countermeasure, the effects of an estimation-based attack are approximately reversed. Alternatively, this may be called approximately "undoing" the attack. As part of this "undoing," the exemplary countermeasure estimates the digital good coefficient $y_i$ from the attacked digital good $z_i$.

Mathematically, the undo operator of the exemplary countermeasure is $U(z_i, \alpha)$, where $z_i, \alpha \in \mathbb{R}$, is defined as follows:

$$u_i = U(z_i, \alpha) = \begin{cases} z_i + \alpha \text{sign}(z_i), & |z_i| > 2\alpha \\ z_i - \alpha \text{sign}(z_i), & |z_i| \leq 2\alpha \end{cases} \qquad (1.5)$$

Given a digital good coefficient $z_i$ created using an estimation-based attack as $z_i = y_i - \alpha \text{sign}(y_i)$, where $y_i$ is a weighted sum $y_i = x_i + \delta w_i$ of a normal zero-mean i.i.d. variable $x_i$ and a spread-spectrum sequence chip $w_i$ and $\alpha \geq \delta$, optimal estimation $u_i$ of the digital good $y_i$ such that $E[|u_i - y_i|]$ is minimal, is given using the undo operator $u_i = U(z_i, \alpha)$.

Probability Distribution Function (PDF)

FIGS. 2A-2D illustrate the positive and negative probability distribution function (PDF) of goods (e.g., signals). Those who are skilled in the art are familiar with PDFs of a digital good. For the purposes of illustration, the arrows on the x and y axes indicate positive directions. In FIGS. 2A-2D, the positive directions are from down-to-up and from left-to-right.

Figure 2A:
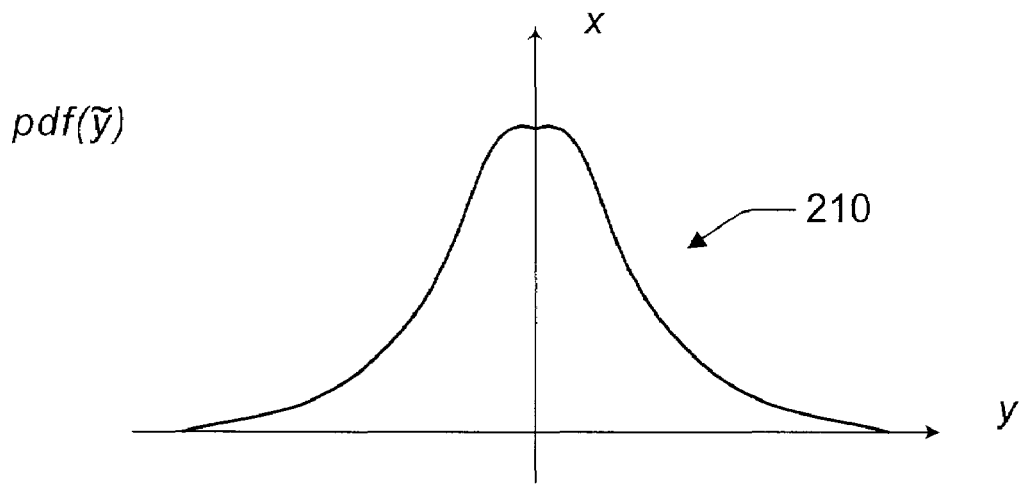
FIGS. 2A-2B are graphs illustrating an example of a probability distribution function (PDF) of a marked signal, e.g., $pdf(\tilde{y})$.

FIG. 2A illustrates the positive and negative PDF of the marked $\tilde{y}$, which may be labeled pdf($\tilde{y}$) or PDF 210, herein. As is typical of a Gaussian distribution, the shape of the illustrated pdf($\tilde{y}$) is the familiar bell-shaped curve. Often, the marked digital good $\tilde{y}$ has a slight bump or dimple at its apex when compared to the unmarked digital good $\tilde{x}$ (not shown).

Figure 2B:
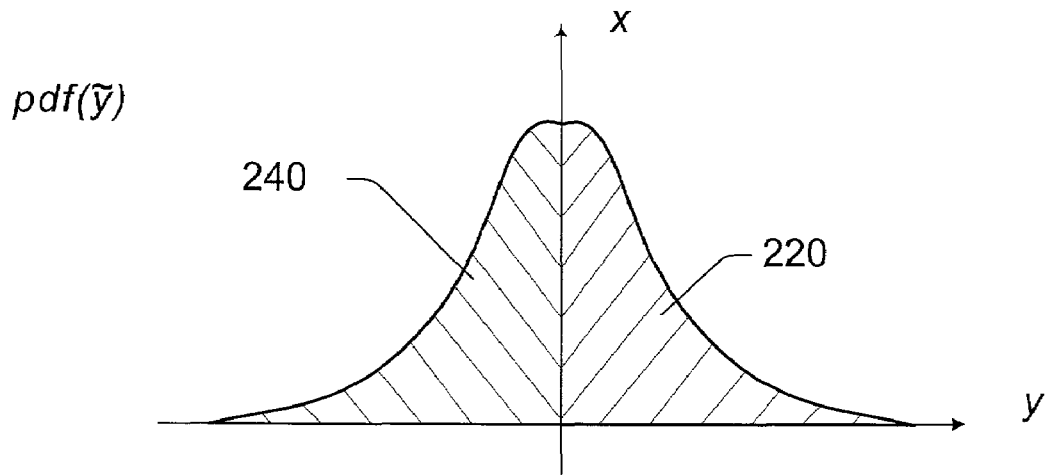

FIG. 2B illustrates the same pdf($\tilde{y}$) as FIG. 2A, but the positive half 220 and negative half 240 of the curve are hatched differently to distinguish them from each other in this figure and the next.

Figure 2C:
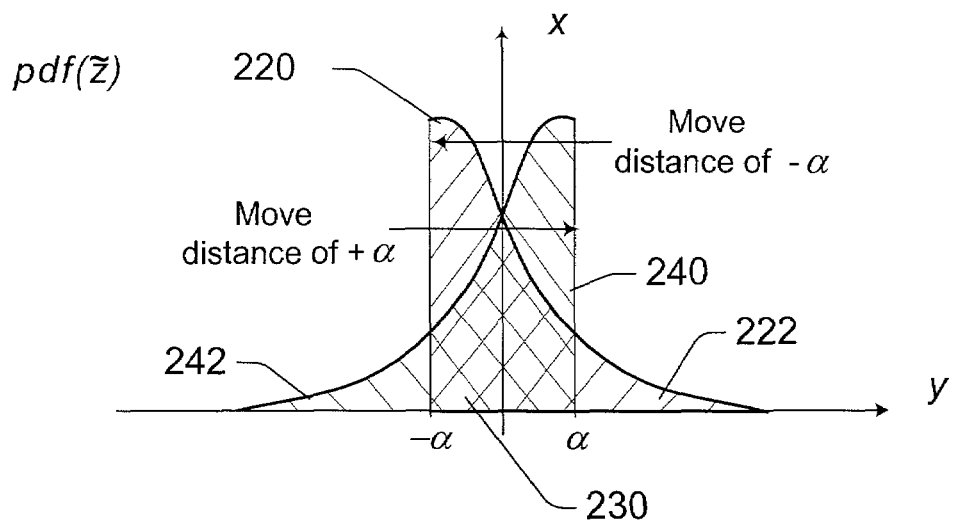
FIG. 2C is a graph illustrating an example of a decomposition of a PDF of the marked signal (of FIGS. 2A-2B) after an estimation-based attack, e.g., $pdf(\tilde{z})$.

One of the effects of attacking a digital good with an estimation-based attack is that the positive and negative halfs of the PDF are shifted. More precisely and as shown in FIG. 2C, the positive half 220 and negative half 240 of pdf($\tilde{y}$) are shifted a distance of $\alpha$ against the sign of $\tilde{y}$.

According the Equation (1.4), the attacked digital good $\tilde{z}$ is produced by modifying the marked digital good $\tilde{y}$ by a scaled estimated watermark $\tilde{v}$. The estimated watermark $\tilde{v}$ tends to be quiet small relative to the other goods. The scaling factor for the estimated watermark is $\alpha$.

Therefore, the PDF of the attacked digital good, pdf($\tilde{z}$), may be approximated as the shifting of the positive half 220 a distance of $\alpha$ against the sign of $\tilde{y}$ and the shifting of the negative half 240 of pdf($\tilde{y}$) a distance of $\alpha$ against the sign of $\tilde{y}$.

Estimation-Based Attack: Shifting of PDF Halves

FIG. 2C illustrates a deconstruction of pdf($\tilde{z}$) using the two halves 220 and 240 of pdf($\tilde{y}$) of FIG. 2B. This figure helps demonstrate the approximate effects of an estimation-based attack. It does so by showing how the pdf($\tilde{z}$) produced by the attack may be represented as moving the positive half 220 and negative half 240 of pdf($\tilde{y}$) of FIG. 2B.

In FIG. 2C, positive half 220 has been moved a distance of $-\alpha$ and across the zero point of y. Therefore, part of positive half 220 exists in the negative portion of y. Likewise, negative half 240 has been moved a distance of $+\alpha$ and across the zero point of y. Therefore, part of the negative half 240 exists in the positive portion of y.

The overlapping region 230 of positive half 220 and negative half 240 is shown as cross-hatched in FIG. 2C. Tail 222 of the positive half 220 is the trailing portion that is not overlapped by negative half 240. Similarly, tail 242 of the negative half 240 is the trailing portion that is not overlapped by positive half 220.

"Undoing" an Estimation-Based Attack: Shifting Back

Using the undo operator described in Equation (1.5), the exemplary countermeasure largely counteracts the effects of the attack and substantially retrieves the values of the original digital good: $\tilde{y}: \forall(y_i > 2\alpha), u_i = y_i$. In other words, the exemplary countermeasure "undoes" the effect of the attack by "moving" selected portions of the attacked digital good (pdf($\tilde{z}$)) against the likely direction of the attack.

Figure 2D:
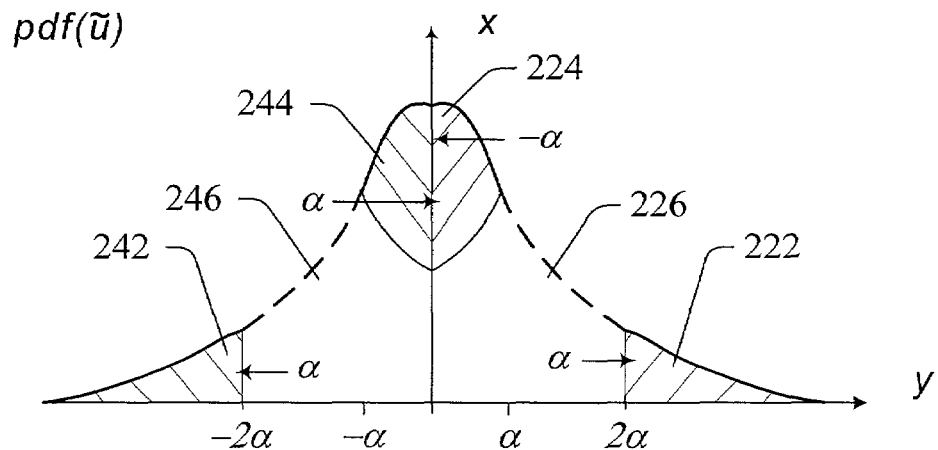
FIG. 2D is a graph illustrating an example of a decomposition of a PDF of the attacked signal (of FIG. 2C) after being processed using techniques of an implementation described herein.

FIG. 2D illustrates an example of the effect of that countermeasure. It shows a decomposed PDF of the "undone" digital good $\tilde{u}$ (i.e., pdf($\tilde{u}$)), where digital good $\tilde{u}$ is the result of an undo operator, such as that of Equation (1.5).

Tails 222 and 242 are moved away from the x axis. They are moved a distance of $\pm\alpha$. Since the shape of these tails remain virtually unchanged by an estimation-based attack, the exemplary countermeasure may move them back to their likely position for the pdf($\tilde{y}$).

Little can be determined from the overlap region 230 (shown in FIG. 2C) because both halves 220 and 240 overlap, as the name suggests. However, wedge 224 of the positive half 220 and wedge 244 of the negative half 240 remain intact. The exemplary countermeasure may select each wedge and move them back to their likely position for the pdf($\tilde{y}$), which is on the other side of x axis. Each wedge is moved a distance of $\pm\alpha$ towards the x axis.

Then, the exemplary countermeasure may determine (via extrapolation, interpolation, and such) the curve 226 between the tail 222 and wedge 224. Similarly, the curve 246 between the tail 242 and wedge 244 may be determined.

Approximation of PDF of Original Digital Good $\tilde{y}$

The resulting pdf($\tilde{u}$)—for which, an example is shown in FIG. 2D—is an approximation of the original pdf($\tilde{y}$). In other words, pdf($\tilde{u}$)≅pdf($\tilde{y}$). Thus, the estimation-based attack is effectively "undone." Based upon this resulting pdf($\tilde{u}$), a watermark detector may now detect and/or determine the original embedded watermark $\tilde{w}$.

In this implementation, the exemplary countermeasure may be viewed at a front-end that processes the incoming digital good. It may first analyze the digital good to determine if was likely to have been subject to an estimation attack. If it is determined to be so, then it may employ an undo operator, such as that of Equation (1.5). After that, the resulting digital good may be provided to the watermark detector.

Determining Likelihood of Attack

Figure 3:
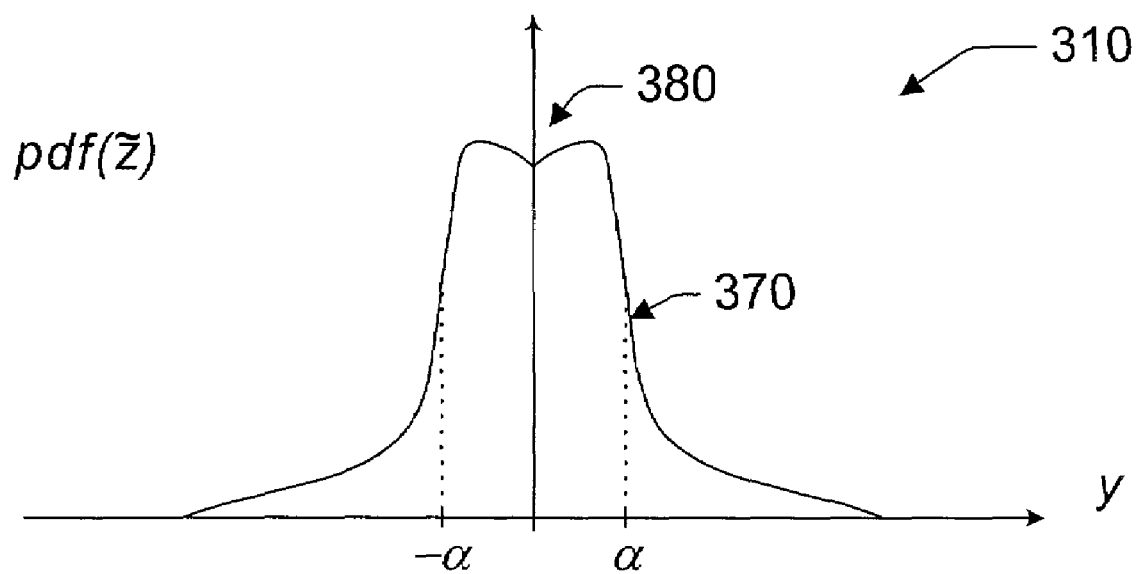
FIG. 3 is a graph illustrating an example of a composition of the attacked signal, $pdf(\tilde{z})$, of FIG. 2C.

FIG. 3 illustrates an example of a composed PDF 310 of a digital good after an estimation-based attack. Upon analyzing the PDF 310 of the digital good, the exemplary countermeasure can estimate the likelihood that the digital good was the subject of an attack by analyzing empirical characteristics of an attacked digital good.

For example, the PDF of an attacked digital good (such as PDF 310) typically has a shape that may be described cratered tower with a tapered base. The shape is akin to a cratered version of the famous "Devils Tower" of the Devils Tower National Monument (located in northeastern Wyoming). This shape is different than the expected bell-shape of an un-attacked (i.e., generally Gaussian) digital good.

Some of the empirical characteristics that the exemplary countermeasure may look for include:

a steep slope 370 with taped feet;

a crater 380 at the apex of the tower; and/or a combination of both.

Estimated Attack-Amplification

Also, the location of the steep slope 370 may be used to determine the estimated attack-amplification value $\alpha$ that the attacker is suspected of employing. This estimated $\alpha$ may be used to "undo" the attack using the exemplary countermeasure.

In addition, the exemplary countermeasure can make one or more educated estimate of the likely the attack-amplification value $\alpha$. Since the attacker wants to maximize the perceptual quality of the attacked digital good, the attacker is likely to select a minimum attack-amplification value $\alpha$ that effectively removes the watermark with a minimal degree of distortion.

Methodological Implementations of the Exemplary Countermeasure

Figure 4:
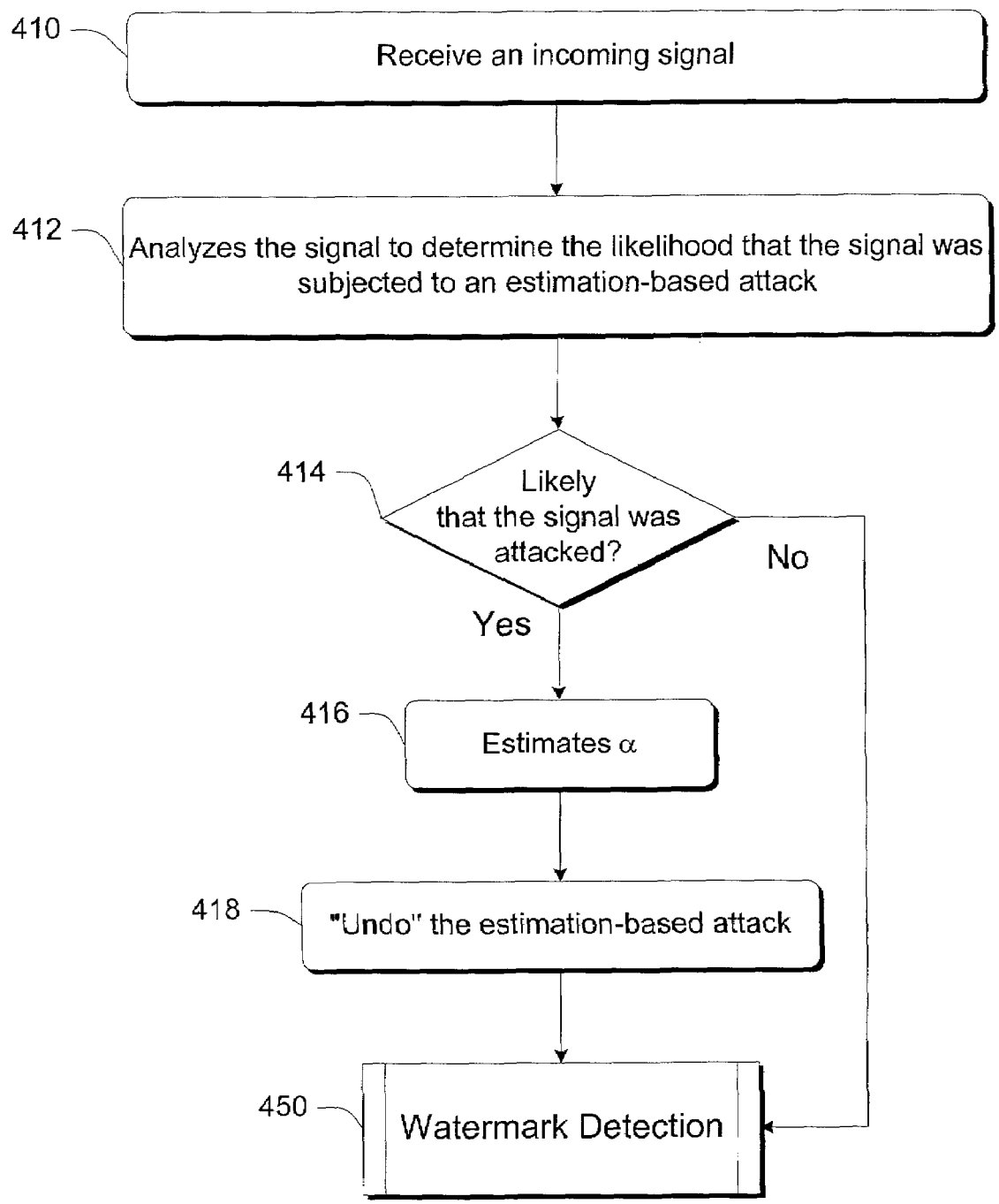
FIG. 4 is a flow diagram showing a methodological implementation described herein.

FIG. 4 shows a methodological implementation of the exemplary countermeasure. This methodological implementation may be performed in software, hardware, or a combination thereof.

At 410, the exemplary countermeasure receives an incoming digital good (e.g., signal). It is typically not known whether the digital good has been attacked. If it has not been attacked, this is the marked digital good $\tilde{y}$. Otherwise, it is the attacked digital good $\tilde{z}$.

At 412, the exemplary countermeasure analyzes the digital good to determine the likelihood that the digital good was subjected to an estimation-based attack. It analyzes one or more empirical characteristics of the digital good. It may, for example, examine the PDF of the digital good to determine if it similar empirical characteristics to the PDF of the attacked digital good shown in FIG. 3.

If, at block 414, it is determined that it is unlikely—based upon some threshold determination—that the digital good was attacked, then the process proceeds to watermark detection at 450. Otherwise, it proceeds to the next block 416.

At 416, the exemplary countermeasure determines the estimated attack-amplification value $\alpha$ (as illustrated in FIG. 3). The empirical characteristics of the digital good itself may help in this determination. In addition, the exemplary countermeasure may make an "educated estimate" of the likely attack-amplification value $\alpha$ based upon knowing that the attacker wishes to minimize distortion.

At 418, the exemplary countermeasure employs an undo operator, such as that of Equation (1.5), on the digital good to effectively "undo" the estimation-based attack on the digital good and recover an approximation of the original marked digital good. The resulting digital good, $\tilde{u}$, is sent to watermark detection at 450.

Other Implementation Details

Mathematically, the undo operator of the exemplary countermeasure is $U(z_i,\alpha)$, where $z_i, \alpha \in \mathbb{R}$, is according to "undo" operator of Equation (1.5). Given a digital good coefficient $z_i$ created using an estimation-based attack as $z_i = y_i - \alpha \text{sign}(y_i)$, where $y_i$ is a weighted sum $y_i = x_i + \delta w_i$ of a normal zero-mean i.i.d. variable $x_i$ and a spread-spectrum sequence chip $w_i$ and $\alpha \geq \delta$, optimal estimation $u_i$ of the digital good $y_i$ such that $E[|u_i - y_i|]$ is minimal, is given using the undo operator $u_i = U(z_i, \alpha)$.

Using this undo operator, the exemplary countermeasure largely counteracts the effects of the attack and substantially retrieves the values of the original digital good: $\tilde{y}: \forall (y_i > 2\alpha), u_i = y_i$. In other words, the exemplary countermeasure "undoes" the effect of the attack by "moving" selected portions of the attacked digital good (pdf($\tilde{z}$)) against the likely direction of the attack.

If one defines a subset $Y(a,b) \subset \tilde{y}$ s.t. $y_i \in Y(a,b)$ iff $a < y_i < b$. Since for a zero-mean Gaussian distribution of $x_i$ and $\alpha > \delta$, $|Y(0,\alpha)| > |Y(-2\alpha,-\alpha)|$, then $u_i$ is the optimal estimation of $y_i$ based on a given $z_i$ s.t. $-\alpha < z_i < 0$. Similarly, since $|Y(-\alpha,0)| > |Y(\alpha,2\alpha)|$, $u_i$ is an optimal estimation of $y_i$ based on $z_i$ s.t. $0 < z_i < \alpha$.

The expected value for the correlation of the recovered $\tilde{u}$ and $\tilde{w}$ is:

$$E[\tilde{u} \cdot \tilde{w}] = \delta - \alpha [erfc(a) - erfc(b) - erfc(c) + erfc(d)] \quad (1.6)$$

where $a = \dfrac{\alpha - \delta}{\sigma_x \sqrt{2}}, b = \dfrac{\alpha + \delta}{\sigma_x \sqrt{2}}, c = \dfrac{2\alpha - \delta}{\sigma_x \sqrt{2}}, d = \dfrac{2\alpha + \delta}{\sigma_x \sqrt{2}}.$ The exemplary countermeasure to the estimation attack is unlikely to recover the magnitudes of $Y(-2\alpha,-\alpha) \cup Y(\alpha,2\alpha)$ which got mixed with $Y(-\alpha,0) \cup Y(0,\alpha)$ during the attack. Those magnitudes are represented as the overlap region 230 in FIG. 2C. The final correlation $E[\tilde{u}, \tilde{w}]$ may be compensated as follows: $E[\tilde{u}, \tilde{w}] = \delta - C_1 + C_2$ with:

$$C_1 = \int_\alpha^{2\alpha} (x - \delta)f(x - \delta) + (x + \delta)f(x + \delta)]dx$$

$$C_2 = \int_\alpha^{2\alpha} (x - \delta - 2\alpha)f(x - \delta) + (x + \delta - 2\alpha)f(x + \delta)]dx$$

where $f(x+c)$ is a function of the normal distribution centered at c with variance $\sigma_x^2$, which results in Equation (1.6).

Exemplary Computing System and Environment

FIG. 5 illustrates an example of a suitable computing environment 500 within which an exemplary countermeasure, as described herein, may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The exemplary countermeasure may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary countermeasure may be described in the general context of computer-executable instructions, such as program modules, being executed by a computer. Generally, program modules include routines, programs, objects, components, data structures, etc. that perform particular tasks or implement particular abstract data types. The exemplary countermeasure may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing device in the form of a computer 502. The components of computer 502 may include, by are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media may be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 may be connected to the system bus 908 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 516, magnetic disk 520, optical disk 524, ROM 512, and/or RAM 510, including by way of example, an operating system 526, one or more application programs 528, other program modules 530, and program data 532.

A user may enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device may also be connected to the system bus 508 via an interface, such as a video adapter 544. In addition to the monitor 542, other output peripheral devices may include components such as speakers (not shown) and a printer 546 which may be connected to computer 502 via the input/output interfaces 540.

Computer 502 may operate in a networked environment using logical connections to one or more remote computers, such as a remote computing device 548. By way of example, the remote computing device 548 may be a personal computer, portable computer, a server, a router, a network computer, a peer device or other common network node, and the like. The remote computing device 948 is illustrated as a portable computer that may include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which may be internal or external to computer 502, may be connected to the system bus 508 via the input/output interfaces 540 or other appropriate mechanisms. It is to be appreciated that the illustrated network connections are exemplary and that other means of establishing communication link(s) between the computers 502 and 548 may be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Computer-Executable Instructions

An implementation of an exemplary countermeasure may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 500 in which an exemplary countermeasure may be implemented. Specifically, the exemplary countermeasure(s) described herein may be implemented (wholly or in part) by any program modules 528-530 and/or operating system 526 in FIG. 5 or a portion thereof.

The operating environment is only an example of a suitable operating environment and is not intended to suggest any limitation as to the scope or use of functionality of the exemplary countermeasure(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary countermeasure may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer storage medium having computer-executable instructions that, when executed by a computer, performs a method facilitating a watermark estimation-based attack countermeasure, the method comprising:

facilitating the watermark estimation-based attack countermeasure by:
obtaining a digital good, which comprises digital content embodied on one or more computer-readable media, wherein the digital good is not just a watermark;
analyzing the digital good to determine that such digital good was subjected to a watermark estimation-based attack, in response to determining that such digital good was subjected to a watermark estimation-based attack performing a countermeasure comprising:
determining an estimated attack-amplification value $\alpha$ likely employed by a watermark estimation-based attack on the digital good;
producing an approximation of the digital good before it was subjected to the watermark estimation-based attack, whereby the produced approximation of the digital good facilitates a countermeasure to a watermark estimation-based attack, wherein the producing comprises:
identifying portions of a probability distribution function (PDF) of the digital good that remain unchanged after the watermark estimation-based attack on the digital good;
shifting the identified portions of the PDF of the digital good by the estimated attack-amplification value $\alpha$; and
determining the remainder of the PDF between the portions.

2. A medium as recited in claim 1 further comprising providing the approximated pre-attack digital good for watermark detection.

3. A computer storage medium having computer-executable instructions that, when executed by a computer, performs a method facilitating a watermark estimation-based attack countermeasure, the method comprising:
- obtaining a digital good, which had been subjected to a watermark estimation-based attack, wherein the digital good comprises digital content embodied on one or more computer-readable media, wherein the digital good is not just a watermark;
- determining an estimated attack-amplification value $\alpha$;
- producing an approximation of the digital good before it was subjected to the watermark estimation-based attack, whereby the produced approximation of the digital good facilitates a countermeasure to a watermark estimation-based attack, wherein the producing comprises:
  - identifying portions of a probability distribution function (PDF) of the digital good that remain unchanged after the watermark estimation-based attack on the digital good;
  - shifting the identified portions of the PDF of the digital good by the estimated attack-amplification value $\alpha$;
  - determining remainder of the PDF between the portions.

4. A medium as recited in claim 3 further comprising analyzing the digital good to determine whether such digital good was subjected to a watermark estimation-based attack.

5. A medium as recited in claim 3 further comprising providing the approximated pre-attack digital good for watermark detection.

6. A method facilitating a watermark estimation-based attack countermeasure, the method comprising:
- obtaining a digital good, which had been subjected to a watermark estimation-based attack, wherein the digital good comprises digital content embodied on one or more computer-readable media, wherein the digital good is not just a watermark;
- determining an estimated attack-amplification value $\alpha$;
- producing an approximation of the digital good before it was subjected to the watermark estimation-based attack, whereby the produced approximation of the digital good facilitates a countermeasure to a watermark estimation-based attack, wherein the producing comprises:
  - identifying portions of a probability distribution function (PDF) of the digital good that remain unchanged after the watermark estimation-based attack on the digital good;
  - shifting the identified portions of the PDF of the digital good by the estimated attack-amplification value $\alpha$;
  - determining remainder of the PDF between the portions.

7. A method as recited in claim 6 further comprising analyzing the digital good to determine whether such digital good was subjected to a watermark estimation-based attack.

8. A method as recited in claim 6 further comprising providing the approximated pre-attack digital good for watermark detection.

9. A watermark detection system comprising:
- a memory comprising a set of computer program instructions; and
- a processor coupled to the memory, the processor being configured to execute the computer program instructions facilitating a watermark estimation-based attack countermeasure, such instructions that when executed by a processor perform a method comprising:
  - obtaining a digital good, which had been subjected to a watermark estimation-based attack, wherein the digital good comprises digital content embodied on one or more computer-readable media, wherein the digital good is not just a watermark;
  - determining an estimated attack-amplification value $\alpha$;
  - producing an approximation of the digital good before it was subjected to the watermark estimation-based attack, whereby the produced approximation of the digital good facilitates a countermeasure to a watermark estimation-based attack, wherein the producing comprises:
    - identifying portions of a probability distribution function (PDF) of the digital good that remain unchanged after the watermark estimation-based attack on the digital good;
    - shifting the identified portions of the PDF of the digital good by the estimated attack-amplification value $\alpha$;
    - determining remainder of the PDF between the portions.

10. A system as recited in claim 9, wherein the instructions further comprise analyzing the digital good to determine whether such digital good was subjected to a watermark estimation-based attack.

11. A system as recited in claim 9, wherein the instructions further comprise providing the approximated pre-attack digital good for watermark detection.

* * * * *